C. M. HECK.
INCUBATOR.
APPLICATION FILED JAN. 16, 1915.
1,314,473.
Patented Aug. 26, 1919.
4 SHEETS—SHEET 2.
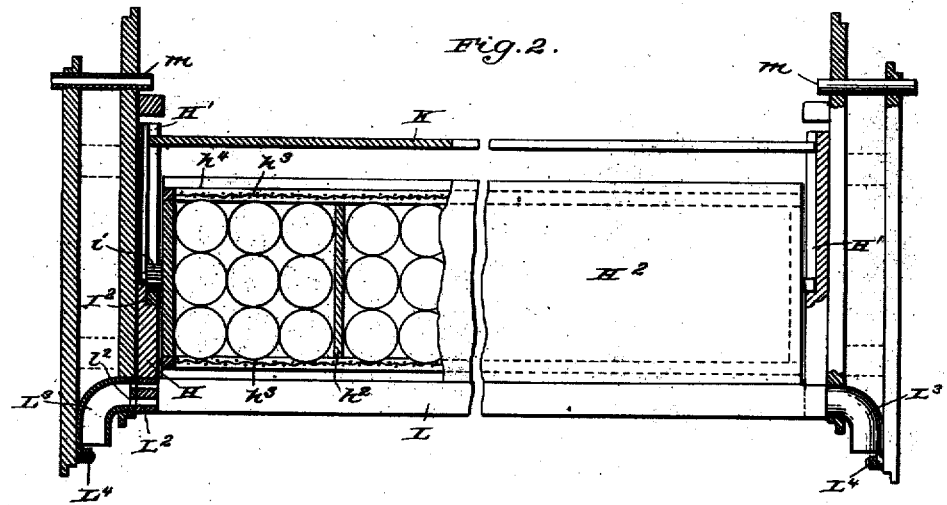
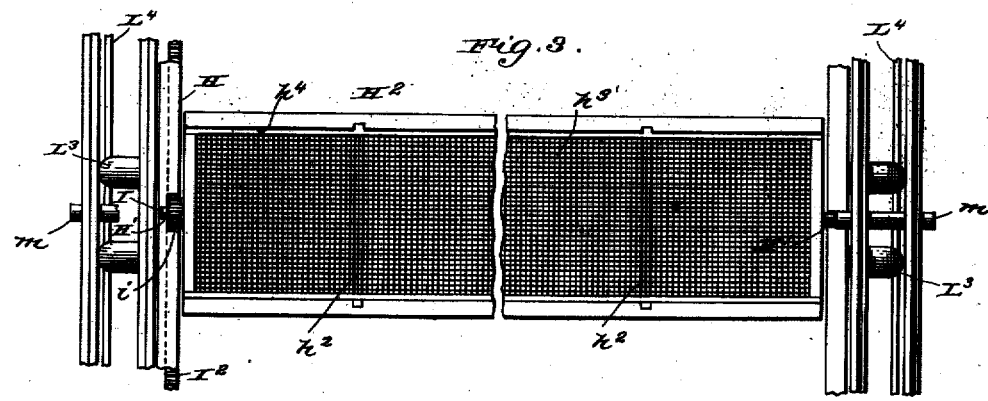
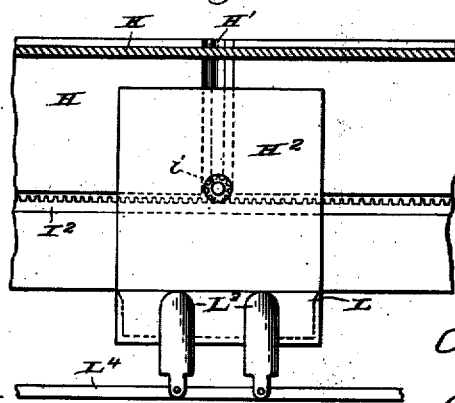
Witnesses:
L. L. Taylor
G. Wedemeier
Inventor
Charles M. Heck
Bacon & Milans
Atty's C. M. HECK.
INCUBATOR.
APPLICATION FILED JAN. 16, 1915.
1,314,473.
Patented Aug. 26, 1919.
4 SHEETS—SHEET 3.
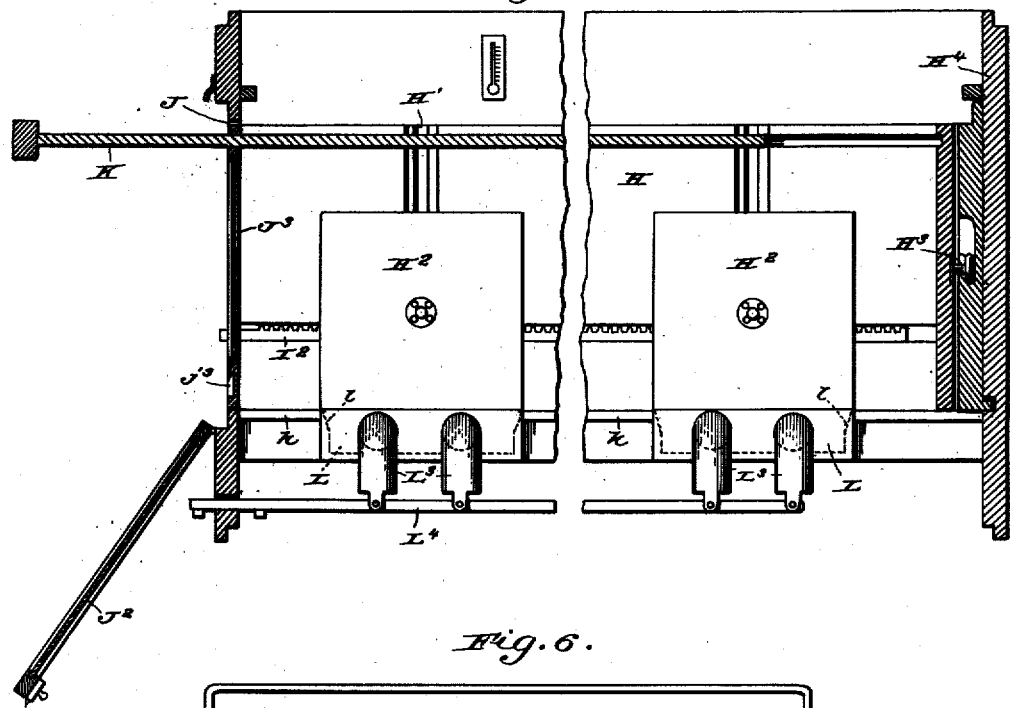
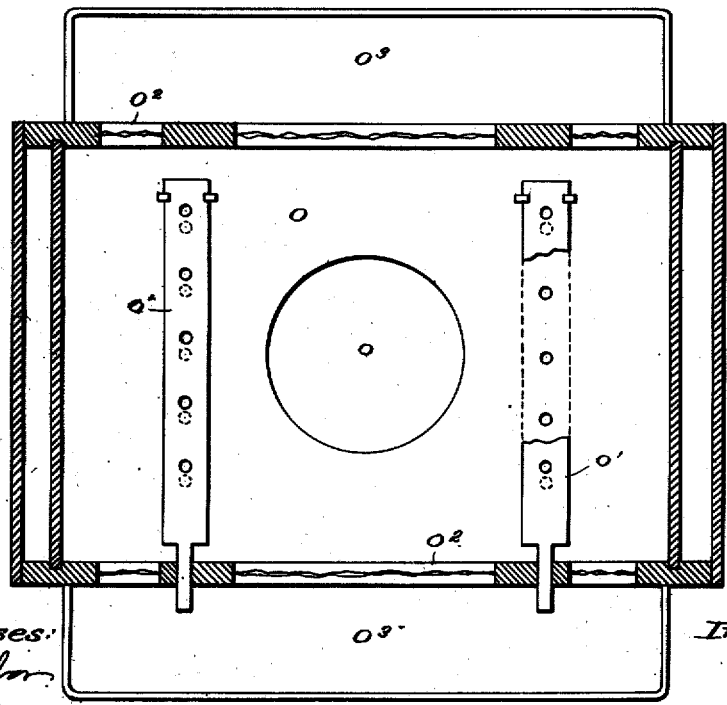
Witnesses:
Inventor:
Charles M Heck
Bacon & Milans Atty's C. M. HECK.
INCUBATOR.
APPLICATION FILED JAN. 16, 1915.
1,314,473.
Patented Aug. 26, 1919.
4 SHEETS—SHEET 4.
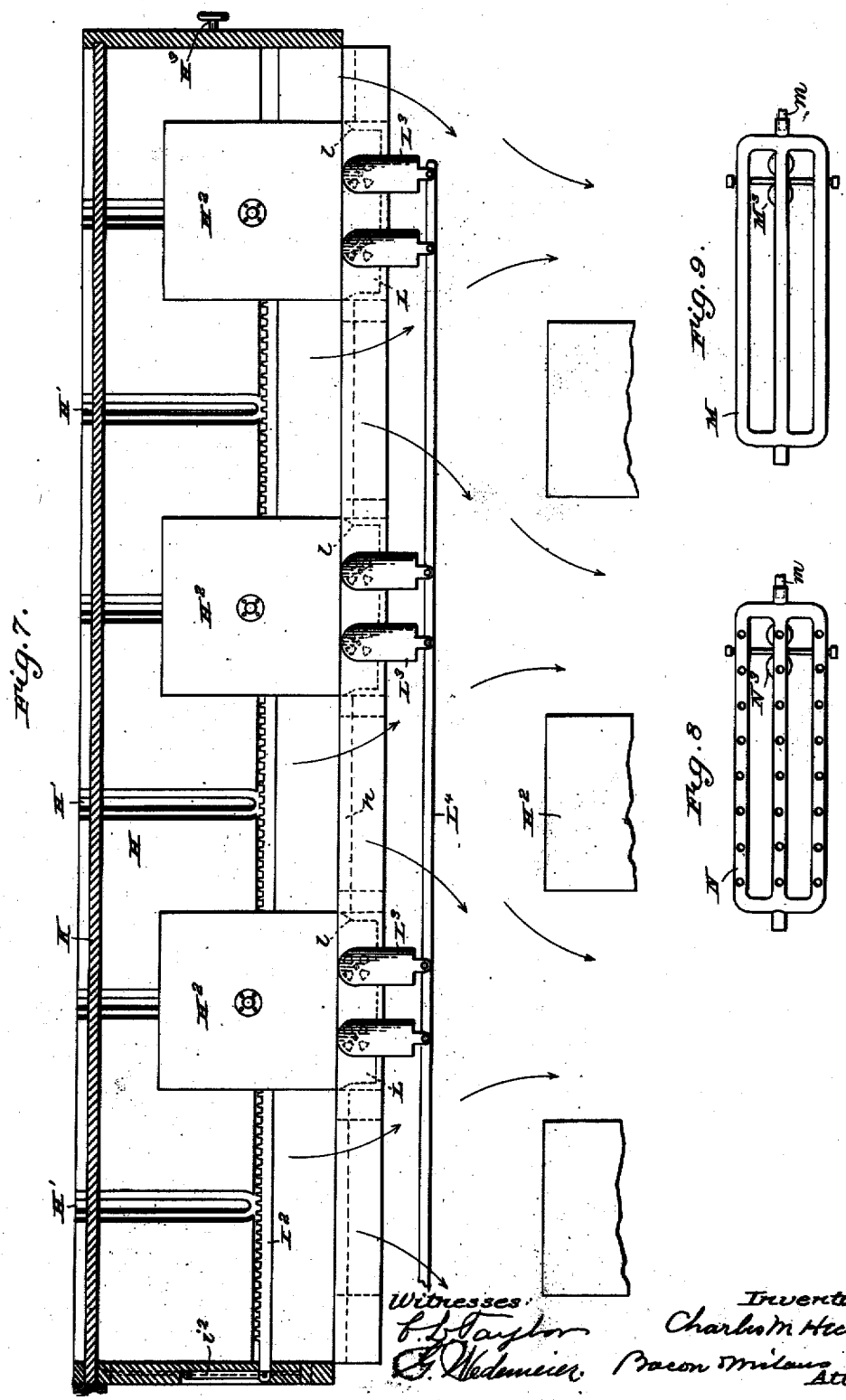

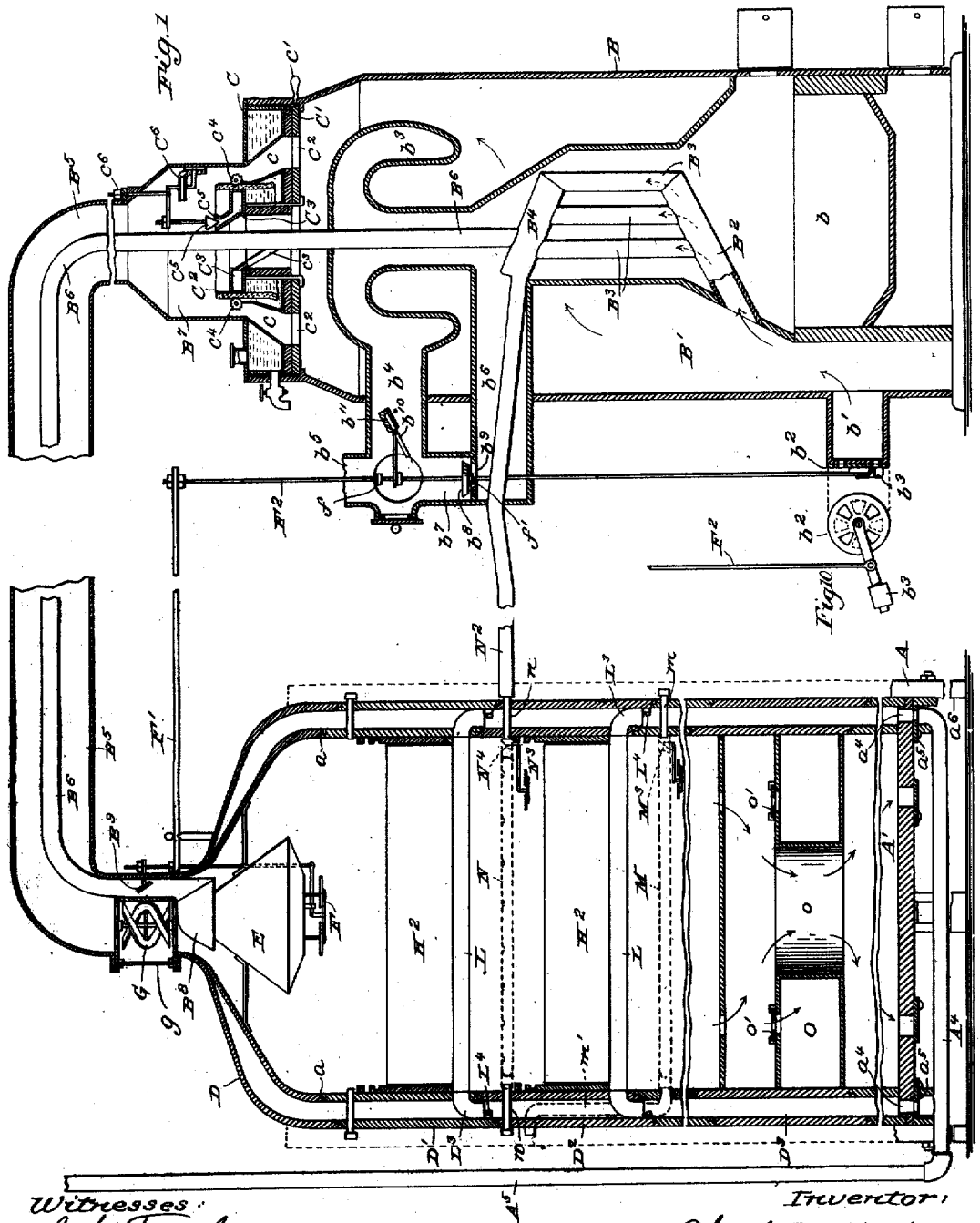

UNITED STATES PATENT OFFICE.

CHARLES M. HECK, OF RALEIGH, NORTH CAROLINA.

INCUBATOR.

1,314,473.     Specification of Letters Patent.     Patented Aug. 26, 1919.

Application filed January 16, 1915. Serial No. 2,608.

*To all whom it may concern:*

Be it known that I, CHARLES M. HECK, a citizen of the United States, residing at Raleigh, in the county of Wake and State of North Carolina, have invented certain new and useful Improvements in Incubators, of which the following is a specification, reference being had therein to the accompanying drawing.

This invention relates to an improved incubator and more particularly that type generally known as the Mammoth incubator, although the many features of the invention are applicable to other types of incubators.

Among the various objects of the invention, the following may be stated: the provision of an incubator formed in units or sections, so that the capacity of the incubator may be increased or decreased according to requirements; an incubator wherein quick automatic control of the temperature and ventilation is due under various stages of incubation; an incubator whereby the temperature within the incubator is controlled automatically by air supply having different temperatures; to provide an improved moisture supply under automatic control; an incubator having a series of removable trays or egg carriers with means for closing the incubator chamber upon the removal of a tray or carrier; an incubator having reversible egg carriers or trays with means for rotating the trays from without the incubator; an incubator having means for supplying fresh air to the eggs and for removing the contaminated air at different points adjacent the eggs, while maintaining a supply of fresh air to the underlying trays; an incubator having means for cooling the interior thereof without the admission of cool air directly to the same; an incubator built in sections and having a primary heat supply for all the sections, and a secondary heat supply automatically controlled for different sections or at different points in the incubator chamber; and finally, an incubator which is well adapted for the treatment of a large number of eggs with the relatively economical heat supplying device, and wherein perfect ventilation and proper heat conditions are maintained. Of course, it is to be understood that there are many other features which will presently be described, all of which are important in their general association and combination.

While a special form of construction is shown, it is to be understood that such forms and proportions of parts may be varied and changed without materially departing from the nature and spirit of the invention.

In the drawings,

Figure 1 represents a vertical sectional elevation of a furnace and incubator with its connecting parts and parts being broken away, for the purposes to be presently stated.

Fig. 2 is a detail view of a section of the incubator chamber showing parts broken away and parts in elevation, Fig. 3 is a plan view of the construction shown in Fig. 2, showing parts broken away, Fig. 4 is a detail end view of one of the egg holding trays and its associated parts, Fig. 5 is a longitudinal section through one of the tray drawers, showing its associated parts and showing the egg trays in end elevation, Fig. 6 is a top plan view of the brooder section, Fig. 7 is a longitudinal section through the tray drawer, showing the relative arrangement of the trays, and the position of adjacent trays, Fig. 8 is a detail view of a supplemental heater, and Fig. 9 is a detail view of a cooler.

Fig. 10 is an elevation of the damper.

In Fig. 1 of the drawings, the incubator is shown with its supporting uprights A broken away at their lower end to indicate that the incubator structure itself is on a plane considerably above the plane of the heater or heat supplying device, which is shown at the right. The bottom A' of the incubator will normally occupy a position approximately on a line or plane of an upper portion of the furnace or heater for purposes presently to be described. The heater B may be of any convenient form, conveniently a stove or furnace having a fire pot $b$ with fuel and air pit doors. The fire pot is surrounded by a jacket, much as an ordinary hot air furnace, and the jacketed space B', has an air supply $b'$ at its lower portion, which is controlled by a rotary damper of any convenient form, as at $b^2$. Entering the upper part of the combustion chamber of the furnace is an air heating pipe $B^2$ opening from the air chamber B', and terminating in a series of risers $B^3$ merging in a header $B^4$. The air heating space B' extends to the top of the furnace, as is usual, and the warm air is conducted from the top through a general hot air flue $B^5$, which is carried upward a suitable distance transversely and terminates in the top of the incubator chamber, in a manner presently to be described. Located in the upper end of the air chamber B is the heating dome $b^3$, from which leads an indirect flue $b^4$ to the outlet or uptake $b^5$. The direct draft flue is indicated at $b^6$ having an upwardly extended branch $b^7$ controlled by a vertically movable damper $b^8$, which is in the form of a valve adapted to fit a seat $b^9$. In the passageway $b^4$ from the dome, there is a controlling damper $b^{10}$. Both the valve and the damper will be presently described in connection with the general control.

From the header $B^4$ extends what will be termed a hot air supply pipe $B^6$, the same being conveniently positioned in the warm air flue $B^5$, and terminating at the upper end of the incubator chamber in a manner presently to be described.

At the top of the warm air chamber of the furnace is a water receptacle C, having a suitable fill opening and discharge opening of any convenient form. Through this receptacle suitable warm air flues $c$ are formed, which are conveniently located substantially in the center of the water compartment. Below the water chamber C is an insulating damper C' having a handle portion $c'$ arranged at the outside of the chamber, so that the said damper may be turned to bring the openings $c^2$ thereof in line with the warm air flues $c$, as shown in Fig. 1. This arrangement permits the warm air from the jacketed chamber to pass directly up through the water in the reservoir C and to heat the same to a proper temperature for supplying moisture to the incubator. By cutting off the heat through the turning of the damper, and owing to the heat insulating character of the damper, the water in the reservoir may be allowed to cool when desired. $C^2$ represents a wick of considerable width, having its lower edge dipped into the water of the reservoir C, and its upper edge projected into the warm air flue, which flue is somewhat enlarged, as at $B^7$. The wick is held in position and is superheated by the following means. $C^3$ represents a hollow ring shaped flue fixedly secured on the top of the wall of the receptacle and held in position thereon. Leading into this flue is a branch pipe $c^3$ from the hot air pipe $B^6$. This circular flue $C^3$ has a vertical outer wall around which the wick is fitted, and the wick is raised or lowered by any convenient means, such as star wheels $c^4$. To create a circulation of hot air from the hot air pipe $B^6$ through the wick heating chamber and flue $C^3$, a valve controlled port $c^5$ is employed, leading out from the top of the superheating chamber $C^3$, and which port is controlled by a hygrostatically operated valve $C^5$. The hygrostat, in this instance, is shown diagrammatically at $C^6$. In addition to the automatic control by the hygrostat, the valve $C^5$ may be adjusted for proper control by means of the nut $c^6$. The operation of this feature of the invention may be stated as follows: That as the moisture becomes below the normal or desired point, the hygrostat will raise the valve $C^5$ and create a circulation of hot air directly through the heating flue $C^3$, which will heat the wick $c^2$, and thereby increase the evaporation and the moisture carried over by the warm air passing through the pipe $B^5$. The application of hot air to the wick, as indicated, permits a very accurate control of the moisture carried over by the warm air. It will be noted that the term "warm air" is applied to that air which is delivered to the incubator from the jacket of the furnace, while the term "hot air" is employed as indicating the air which is delivered to the incubator through the smaller pipe leading from the superheater, which is located in the fire pot.

The incubator chamber is composed, conveniently, of a series of units, represented in the drawing as having a top D, intermediate sections D' and $D^2$, and a brooder section $D^3$. Each unit is composed of side walls of heat insulating material, the front and the rear wall being conveniently of single thickness, as distinguished from a double or spaced walls, while the side walls, as shown in Fig. 1 of the drawing, are double walls having air spaces therebetween to constitute not only insulating spaces but ventilating flues. Each section is made with the inner portions stepped or on a higher plane than the outer portion of the walls, as shown in Fig. 1 at $a$, and the edges are rabbetted so that a perfect fit is secured when the parts are located, one on top of the other.

In the top section D is located a deflector E directly below the inlet of the warm air pipe $B^5$. By the use of this deflector the incoming warm air is distributed outwardly toward the side walls of the incubator chamber. On the deflector conveniently is positioned a thermostat F, which controls through suitable levers the actuating lever F' for operating the valves of the heater. These various levers and rods are shown generally diagrammatically, but the arrangement and purpose will be readily understood. The outer end of the operating lever F' carries a vertically reciprocating damper rod $F^2$, which passes through an operating arm of the damper $b^{10}$, and has thereabove a nut $f$ adapted to contact the arm of the damper, after the rod $F^2$ has moved down a considerable distance. The valve $b^8$ is loosely mounted on the rod $F^2$ and is lifted from its seat by the upward movement of the rod through the instrumentality of a nut or shoulder $f'$ fixed on the rod. These parts are so arranged that upon the upward movement of the rod $F^2$, the damper $B^{10}$ will be released and rocked to an open position by having a weight $b^{11}$ thereon. In this position, the indirect draft is open and the direct is closed. Should the fire pot need a direct draft, the further upward movement of the rod $F^2$ will unseat the valve $B^3$ and cause a direct draft to go through the uptake. On the air inlet $b'$ of the air chamber B is, as above stated, the rotary damper or cut off $b^2$. The operating arm of damper $b^2$ is weighted at $b^3$, (see elevation Fig. 10) and the lower end of rod $F^2$ is connected to this arm at a point between $b^3$ and the axis of the damper. The parts carried by the rod $F^2$ are so positioned that upon an overheating of the incubator the thermostat F will cause the air inlet damper $b^2$ to open, allowing an abundance of fresh air into the chamber $B'$, from whence it will issue into the top of the incubator, and owing to its volume, the temperature thereof will be reduced. Upon a further movement, the draft through the fire will be reduced by the closing of the direct flue damper and a subsequent closing of the indirect flue. Upon a reversal of the conditions, the weight will reposition the parts as the thermostat collapses, closing the air inlet against a superabundance of air opening the indirect damper, in the first instance, and subsequently the direct damper. It will therefore be seen that, by the arrangement, an automatic control of the ventilating air, as well as the fire of the heater, is secured through the thermostat, conveniently located in the incubator chamber.

The hot air pipe $B^6$ terminates in a spreader $B^8$ directly above the spreading cone E and is provided at or near its outlet with a damper $B^9$. This damper is also under the control of the thermostat F, so that the amount of hot air is readily controlled and cut off. The relative action of the hot air and warm air pipes may be in short described as follows. When the temperature falls too low in the incubator chamber the hot air pipe is opened, which not only admits air of high temperature into the incubator, but makes the entire flue hotter, therefore increasing the draft from the warm air chamber up the warm air pipe, but as the inlet to the warm air chamber has simultaneously been constricted the air from the warm air pipe has also a higher temperature. Thus the whole heat capacity of the furnace through both pipes quickly coöperate to restore the desired temperature. This action is distinguished from apparatus wherein the fire or primary source of heat is increased or diminished to control the temperature. These various parts, governable by the thermostat, can be set for different conditions in any desired manner, the connection between the damper $B^9$ and the vertical link of the thermostatic control being shown somewhat diagrammatic, but it is to be understood that the connection is with the pivot of the damper and is to be operated in a manner to effect the proper control.

Adjacent the upper end of the incubator is a rotary indicator, conveniently consisting of propeller blades G of different color arranged in the path of the incoming warm air and visible through a glazed opening $f$. By observing the rapidity of rotation of this indicator, it can be ascertained whether the relative amount of air passing out of any exit flue, $L^3$, is too great or too small. Comparing the decrease of the rapidity of rotation of G caused by closing one exit flue with the decrease under the same circumstances when closing another exit flue the needed adjustment of the opening in the one flue to equalize the flow between the two flues will be indicated.

The hatching sections of the incubator are provided with a series of tray carriers in the form of drawers H, each drawer being of substantially rectangular formation and mounted to slide on suitable cleats or tracks $h$ secured to the side walls of the incubator chamber. Each carrier or drawer is provided with grooves $H'$, which extend from at or near the center of the drawer at the sides to the upper edge. The lower end of these grooves form bearings or supports for pintles or hubs I, secured respectively to the egg trays $H^2$. These trays are shown as rectangular and substantially square in cross section and are designed to accommodate a large number of eggs stacked conveniently in rows of three, one on top of the other. They are divided interiorly by partitions $h^2$ and are covered both bottom and top by wire gauze $h^3$, the same being held on suitable removable frames slidably supported in grooves $h^4$. Owing to the pivotal mounting of these trays or egg carriers, it is evident that they can be turned on their axes, so as to reverse the eggs as required. To effect a ready reversal of all the carriers (three carriers to the drawer being shown) a pinion $i$ is secured to one of the shafts, which pinion meshes with a reciprocating rack $I^2$ mounted in the side of the drawer, its end projecting through the front of the drawer, where it is provided with a suitably articulated handle $i^2$ fitting in a recess in the front of the drawer, so that the rack bar can be shoved in or pulled out a sufficient distance to properly rotate the various trays one half turn. The rear part of the drawer H is provided with a headed button $H^3$, which takes into a recess formed in the central part of a false door or closure $H^4$. This closure is fashioned to fit the opening in the incubator wall presently to be referred to. The object thereof is that in drawing the drawer out from the incubator, this follower will close the opening thereof and, by virtue of the interlocking connection of the button head H³ with the groove pocket, the drawer as a whole can be removed, leaving the false door H⁴ in the door opening. In the incubator, there is provided, through its forward single course wall, an opening, as shown in Fig. 5, designated at J. This opening is normally closed by a glazed door J², provided with a suitable latch, the door opening downward. The tray carrying drawer is also provided at its front which constitutes a door with a glazed opening part J³, through which a temperature indicator can be readily observed. The front J³ is provided with a hand hold j³, for the purposes of pulling out the drawer. When a drawer with its egg tray is to be removed, the door J² is lowered and the drawer is out, but to prevent the cold air from coming into contact with the eggs, a slide K is employed fitting in grids or grooves in the top of the drawer, and which is carefully shoved in as the drawer is drawn out. This effectually closes the drawer during its progress outward and prevents the escape of the heated air from the incubator and likewise the cold air from entering the drawer, all as clearly shown in Fig. 5.

To intercept the circulation of vitiated air after it has passed through the egg trays in contact with the eggs, I provide a series of air pans L, shown in dotted lines, Fig. 5, and in Fig. 4. These pans are fixedly positioned across the incubator and are of a width and length equal to that of the egg trays. Their edges are sloped as at l, so that in turning the egg tray, full freedom is permitted, while the entire bottom of the tray is practically covered when the trays are in their normal position, as shown in Fig. 5. Leading from the end of each pan into the hollow side wall of the incubator chamber, are perforated extensions L², there being a series of perforations leading horizontally through the nipple or extension. L³ represents pipe elbows having their horizontal ends pivotally seated in the inner wall of the hollow side of the incubator chamber section and adapted to turn slightly in its bearing thus formed. The inner end of this elbow is provided with a perforated plug l² arranged so that the perforations will register with the perforations of the plug L² in one position, and be out of register upon turning the elbow. To enable the elbows to be turned, bars L⁴ are employed, which are connected to extensions of the elbows, the ends of the bars extending through the side of the casing, as shown in Fig. 5. The incoming air passes down between the eggs in the trays into the pans L, out through the perforated nipples at the ends through the elbow pipes down into the exhaust flue of the incubator and from there out through the bottom A', as shown in Fig. 1. By turning the elbows slightly, the exit of the air can be regulated. By this means also, in conjunction with the indicator G the movement of the air through the incubator can be readily ascertained, and the parts set to supply the required amount. It may be noted, especially with reference to Fig. 5, that upon the lowering of the door J², the rod L⁴ will be struck and upon the removal of the egg trays, all the dampers in the pipe elbows will be closed, preventing the escape of fresh air through the pans. I prefer to have each drawer provided with three well separated egg trays H², the distance between every two trays being slightly different from the width of the tray, as shown in Fig. 7, and directly below this space will be placed the trays of a lower drawer. In this particular, the arrangement is such that there will be three trays to each drawer, which trays will normally bear a staggered relation with each other. This permits a free circulation of fresh air to be passed between the uppermost trays into and through the lowermost trays, there being additional room between the upper and lowermost trays to permit air to circulate down into still lower trays. It is also, so far as I know, broadly new to extract the vitiated air from upper trays as it leaves the eggs. This is a condition which will be recognized as being advantageous.

It is often desirable to interpose into certain zones of the incubator, a cooling medium, but it is recognized that projecting air directly into the incubator has a disturbing and detrimental effect. I therefore have arranged in the incubator below the drawers and pans, hollow grid U-shaped removable coolers M, the same consisting of side bars and a central bar with headers, as shown in detail in Fig. 9. These separate cooling grids have end nipples which engage with slidable pipes m leading through one wall of the section at one end, while the opposite end is coupled into an uptake m', which is carried up the ventilating flue a short distance, and thence out through the side thereof, as shown in Fig. 1. By this means, when the pipe m is open, (normally it will be corked), a rapid circulation of cold air will be permitted to enter the incubator, the draft being created by the heated air in the side flue, heating the uptake pipe m'. These coolers may be arranged at different places or points in the incubator, as desired, and may be controlled by thermostat operating cut off M² in the nipple.

It is often found necessary, also, in the larger type of incubators, to interpose an intermediate heater, and with this in view, I have provided, in one of the intermediate sections, as shown in Fig. 1, a heat distributer N. This is shown in detail in Fig. 9 and consists of a construction, substantially that of the coolers, except the upper surfaces thereof are perforated so as to permit the escape of air into the incubator. The heater is conveniently set into the wall of the incubator in any suitable manner, and has a supply tube $n$. Leading out through one side to this pipe, is coupled a hot air supply pipe $N^2$, leading from the header $B^4$. A thermostat $N^3$ is provided for this supplemental heat, which, through suitable mechanism, controls a damper $N^4$, as shown in Fig. 1 diagrammatically. As soon as the temperature falls below the proper point, this valve $N^4$ is operated, permitting hot air to enter from the superheater directly into an intermediate part of the incubator. The lower section of the incubator is provided with a brooder chamber O, having a circular central opening $o$, through which the heated air passes. For ventilating this brooder chamber O, slides $o'$ are employed. The brooder is also provided with curtain openings $O^2$, communicating with runways or balconies $O^3$, as shown in Fig. 6.

Conveniently in the bottom $A'$ of the incubator chamber, suitable air outlet openings $a^4$ are provided. These openings preferably communicate with an exit pipe $A^4$, which terminates in an uptake $A^5$. This uptake extends to a point conveniently above the top of the incubator chamber, so that a forced draft is created within the incubator for readily extracting the vitiated air. This feature, in conjunction with the damper regulator for the primary air supply, effects a very quick action and maintains a healthy condition within the incubator at all times. The outlets $a^4$ may be governed, if desirable, by dampers $a^5$. There may be also placed in the bottom of the incubator, openings $a^3$ governable by suitable pivoted valves which may be opened when the conditions of the interior of the incubator may require. The entire structure of the incubator chamber is supported on the uprights A, there conveniently being an upright at each corner, and raised on the cleats $a^6$. They, however, may be otherwise attached, if found desirable. From the above detailed description, it will be readily seen that I produce an incubator which can be properly regulated automatically, one which can be increased or diminished in size, and one which will perform the various functions heretofore referred to. The furnace can be located in a cellar, and the incubator in an upper floor, but as above stated, it is necessary to have the bottom of the incubator above the center portion of the furnace or heater. This is essential, inasmuch as it sets up a natural draft, accelerated by the heat from the furnace into and through the incubator, out through the lower portion thereof, and so without material opposition to the natural course or movement of the air. Many hundreds of eggs can be treated in this incubator properly and with the maintenance of an exact condition, the eggs can be handled readily and removed and replaced when desired, without permitting the inrush of cold air to the incubator chamber. Each tray may be taken from its drawer and replaced, or the brooder can be taken from an upper course and placed in a lower course or section. Each brooder is readily moved outward for inspection, and during the hatching period the eggs can be distributed in reduced number in lower sections to prevent overcrowding. It will be noted that each section is provided with what may be termed a double door, namely, the end of the drawer and the door $J^2$.

Having thus described the invention, what is claimed as new and desired to be secured by Letters Patent is:

1. In an incubator, the combination with an incubating chamber, of a warm air supply, a hot air supply, means for conducting air from said supplies to said chamber and discharging it above eggs or like producers of animal heat in said chamber, a thermostat positioned near said eggs, means for shielding said thermostat from the direct discharge of air from said supplies, and means operated by said thermostat to cut off one of said supplies and control the volume of air supplied by the other supply.

2. In an incubator, in combination with an incubating chamber containing a variable source of animal heat such as eggs, a hot air supply, a warm air supply, means for conducting air from said supplies to said chamber, a thermostat positioned to be influenced by the temperature of the air in said chamber and by radiant heat from said eggs, and means controlled by said thermostat for varying the relative amount of air sent into the chamber from one of said supplies with respect to the amount sent into the chamber from the other supply.

3. In an incubator, the combination with an incubating chamber, of a warm air supply to said chamber, a hot air supply to said chamber, and means acting automatically as the temperature rises in said chamber to reduce the volume of hot air supplied thereto and increase the volume of warm air supplied thereto simultaneously.

4. In an incubator, the combination with an incubating chamber, of a warm air supply, a hot air supply and means for conducting air therefrom to said chamber, a conduit from said warm air supply to said chamber, a moisture supplying device in said conduit, a thermostat in said chamber, and a damper for said hot air conducting means controlled by said thermostat.

5. In an incubator, the combination with an incubating chamber, of a warm air supply therefor, a moisture supply comprising a wick and a water supply therefor, said wick being positioned to be influenced by said warm air supply before entering said chamber, and hygrostatically controlled means for superheating the wick.

6. In an incubator, the combination with an incubating chamber and a warm air supply, a flue leading from said warm air supply to said chamber, a moisture supplying device in said flue, said device comprising a water receptacle, an evaporating surface associated therewith, a flue passing through said receptacle with an opening adjacent said evaporating surface, a flue passing through said receptacle with an opening more remote from said surface, and means for relatively varying the volume of air through said flues.

7. In an incubator, the combination with an incubating chamber and a warm air supply, a flue leading from said supply to said chamber, a moisture supplying surface in said flue said surface being in annular form of smaller width than said flue, and adjustable means for causing the air passing through said flue to be directed as adjusted through the center of said annular surface or outward between said surface and the walls of said flue.

8. In an incubator, the combination with a heater having at hot air supply, of a moisture supplying device comprising a reservoir and a wick dipping into said reservoir, a series of heating ducts leading through the reservoir, manually operated means for adjusting the openings through said ducts, and hygrostatically controlled means for adjusting the heating of said wicks from the heat of said hot air supply.

9. In an incubator, the combination of an incubating chamber and means for sending into the chamber a current of air, of a plurality of spaced apart egg containers in said chamber, conduits beneath each container conducting out of said chamber all air passing through each respective container, adjustable outlets for said conduits and a visible indicator operated by the current of air entering said chamber.

10. In an incubator, the combination with an incubating chamber, of a plurality of sliding drawers within the chamber arranged one above another, said drawers having down their lengths an even number of spaced apart holders for removable trays, a series of trays in the alternate tray holders in the upper drawer, and a series of trays in the alternate tray holders in the lower drawer, the lower trays being in staggered space relation with respect to those in the upper drawer.

11. In an incubator, the combination with an incubating chamber and means for passing a current of air therethrough, of a series of egg trays in line with the direction of flow of said current, means between said trays for varying the temperature of said current as it passes between the trays, and individual means associated with each of said trays for conducting out of said chamber all of the air passing through that tray.

12. In an incubator, in combination with an incubating chamber and means for causing a current of air to pass therethrough, of a series of egg trays in said chamber spaced apart with respect to the line of flow of said current, the eggs in said trays being exposed to the common temperature and heat radiation within said chamber, and means for causing to pass between the eggs in any tray and out of said chamber a portion of said current, said means being adjustable to cause a relatively greater or lesser flow through any one tray than through another.

13. In an incubator, the combination with an incubating chamber, of a sliding drawer therein having egg trays, a door in said chamber closing behind said drawer, means for turning the respective trays, and a handle associated with said means and having a jointed outer end adapted to be folded up between the drawer closure door and the end of the drawer.

14. In an incubator, the combination with an incubator chamber, of a sliding drawer therein, a false door movably connected to the rear end of said sliding drawer, a removable slide fitted to the upper part of the said drawer and egg trays located within the drawer.

15. In an incubator, the combination with a heater and a sectional incubating chamber, of an end section for said chamber having a thermostat therein controlling said heater, of a middle section of said chamber having connection with said heater through a warm air conduit, and a thermostat in said middle section controlling the passage of air through said conduit.

16. In an incubator, the combination with an incubator chamber and an egg tray, of a main heated air supply, of a heater for the air controlled by a thermostat within said incubator chamber, and thermostatically controlled means for conducting heated air from the heater to the incubator below the main heat supply and a thermostatically operated damper for the last said means.

17. In an incubator, the combination with an incubator chamber adapted to receive a current of heated air at one end, of a perforated pipe member extending thereacross at an intermediate point, means for conducting heated air to the perforated pipe member, and an automatic means for controlling the admission of air to said pipe member.

18. In an incubator, the combination with an incubating chamber and a heater for delivering a current of warm air to one end of the chamber, of means for supplying and circulating cold air through the incubator at a point intermediate the ends thereof.

19. In an incubator, the combination with an incubating chamber adapted to receive a current of heated air at one end, a plurality of trays in said chamber spaced apart with respect to said air admitting end of said chamber, a hollow structure between said trays and means for causing a current of cold fluid to pass through said structure.

20. In an incubator, a plurality of egg trays arranged on different planes, independent air removing devices for each tray, means for causing a current of heated air to pass down said chamber and adjustable means for causing any desired part of said current to pass between the eggs on one level through the bottom of the tray and out of the chamber before reaching the next layer of eggs on the lower level.

21. An incubator having a single incubating chamber composed of a series of removable vertically arranged sections, with means associated with the upper section for supplying heated air to the incubator chamber and means associated with each section for removing heated air.

22. An incubator having an incubating chamber composed of a series of independent removable sections, each section being provided with incubating egg trays, with means for supplying heat leading into an end section of the incubator, and means in each section for removing air near said trays from said chamber.

23. A single chambered incubator formed of a series of independent removable vertically disposed interlocking sections, means for supplying heat leading into an end section of the incubator and means insertible in each section for supplying from the last said means an auxiliary amount of heat to the chamber at the level of that section.

24. An incubator having an incubating chamber composed of a series of independent sections vertically disposed with relation to each other, egg trays carried by each section, and vitiated air extracting means for each tray conducting out of the chamber through the wall of that section all of the air vitiated by the eggs in that section.

25. An incubator having an incubating chamber composed of a plurality of independent sections arranged edge to edge, the whole forming an egg receiving chamber, means for supplying a current of heated air to one end of the chamber, and means insertible in each section for causing the temperature of the air passing through that section to be reduced before passing into the next section.

26. In an incubator, a plurality of egg trays arranged in staggered relation, one above the other, and vitiated air removing means below each tray.

27. In an incubator, the combination with an incubating chamber, of a plurality of sliding drawers within the chamber arranged one above the other, a series of egg trays in the upper drawer spaced apart, a series of trays in a lower drawer spaced apart, and in staggered relation with the upper trays, and means associated with each tray for permitting the escape of vitiated air passed through the tray.

28. In an incubator, the combination with an incubating chamber, of a plurality of sliding drawers within the chamber arranged one above the other, a series of egg trays in an upper drawer spaced apart, a series of trays in a lower drawer spaced apart, and means associated with each tray for permitting the escape of the vitiated air that has passed through the tray.

29. An incubator having an egg tray chamber and air outlet flues at the side and openings for the chamber on different levels communicating with the said side outlet flues, means for supplying heat to the upper end of the incubator, and an air conducting flue leading from the lower end of the air outlet flues to a point above the incubator.

30. In an incubator, the combination with an incubating chamber comprising a series of vertically disposed interengaging sections, egg carriers in each section and means for supplying heat for the incubator chamber communicating with one of the end sections thereof.

31. In an incubator, the combination with an incubating chamber and a heating means therefor, of a sliding drawer within the incubator chamber having a front forming a closure for the chamber, an egg tray within the drawer, and a removable slide closing the upper part of the drawer, said slide being insertible while the drawer is in position within the incubator.

32. In an incubator chamber, a sliding drawer having an egg tray therein, a front to said drawer forming a closure for the chamber when in position in the chamber, of an imperforate sliding closure for the top of said drawer, said closure being insertible while the drawer is in position inside the incubator.

33. In an incubator, the combination with an incubating chamber and heater therefor, of an egg carrying drawer having an open top and bottom, an imperforate movable air excluding cover for the drawer movable into position while the drawer is in the incubator, and a closure for the drawer open- 34. In an incubator, an incubating chamber and means for sending a current of heated air into the chamber at one end, a plurality of sliding drawers in said chamber, said drawers having a front end forming a closure for said chamber and carrying a rear detachable door fitting into the drawer opening through the chamber wall to close same when the drawer is removed, and a slidable closure for the top of said drawer, said closure being insertible while the drawer is in position within the incubator chamber to permit the drawer to be removed with substantially no escape of said air current through said opening while said drawer is being removed.

35. In an incubator, the combination with an incubating chamber having a drawer opening in its side wall and a closure therefor, of a sliding drawer adapted to pass through the opening into the incubator and having a front end serving as a supplemental closure for said door opening, an imperforate sliding cover for said drawer insertible through the front end of said drawer, and means operable by the outward movement of the drawer for closing said opening when the drawer is removed from the chamber.

36. In an incubator, a sliding drawer having a series of pivotally supported egg trays therein, pinions on the trays, a reciprocating rack bar operating the pinions, a pivotal extension on the end of the rack bar, the end portion of the drawer having a recess for inclosing said pivotal extension when the rack bar is in one position.

37. In an incubator, the combination with an incubating chamber having a series of egg trays therein, of air removing devices located below each tray, pipes leading from said devices, and regulating means interposed between the pipes and the said devices, operable by the movement of the pipes.

38. In an incubator, the combination with an incubating chamber having an opening in its side wall, of a swinging door for said opening, a drawer adapted to pass through said opening and to be positioned within the incubating chamber, a plurality of egg trays within the drawer, means for removing vitiated air from below the trays, a damper for regulating the amount of air removed from said trays, and means extending to without the incubator for operating the damper, said means being positioned to be engaged by the said swinging door for actuation.

39. In an incubator, the combination with an incubating chamber having a series of egg trays arranged one above the other, sliding means for carrying the trays, the incubator having openings in the sides thereof for permitting said sliding means to pass into and out of the incubator, and means for preventing the direct escape of heated air from the incubator through the opening during the movement of the sliding means therethrough.

40. In an incubator, the combination with a plurality of egg carrying sections forming an unpartitioned chamber, of a brooder section insertible between said egg carrying sections, means sending a current of air in series through all of said sections, and regulable means for deflecting a portion of said current through the eggs in egg sections or over chicks in the brooder section and out of the incubator.

41. In an incubator, the combination with a plurality of interlocking egg carrying sections forming a sectional and unpartitioned chamber, of a brooder section interlocking with said egg carrying sections, means sending a current of heated air in series through all of said sections, and means insertible in said egg carrying sections for changing the temperature of the air as it passes the last said means.

42. In an incubator, the combination with a plurality of egg carrying sections forming an unpartitioned chamber, of a brooder section insertible between said egg carrying sections, means sending a current of air through all of said sections in series, and means controlled by a thermostat in a section intermediate of the ends of said chamber for changing the temperature of the air as it passes through the said thermostat holding section.

43. In an incubator, the combination with a plurality of egg carrying sections forming an unpartitioned chamber, of means sending a current of heated air through all of said sections in series, and means controlled by a thermostat in a section intermediate of the end sections of said chamber for changing the temperature of the air passing through said thermostat holding section so that the current of air passing therethrough is not varied in volume by said means but its temperature is changed uniformly across said section.

44. In an incubator, the combination with a plurality of interlocking egg carrying sections forming a sectional and unpartitioned chamber, of means sending a current of heated air into an end section of and through said chamber, a thermostat controlling said means, a thermostat in a section intermediate of the ends of said chamber, and means controlled by the last said thermostat for changing the temperature of the air passing therethrough uniformly across said section.

45. In an incubator, a plurality of egg carrying sections forming a sectional and unpartitioned chamber, said sections having a side thereof formed with a double wall with a space therebetween, the outer wall of said double walled side extending below the inner wall of the same side, to unite with the outer wall of a double walled side of a lower section on a line below the level of the line where the inner walls of the two sections unite, forming a continuous tight flue with connections to the outside air at the bottom, and ventilating openings in each section connecting said chamber with said flue.

46. In an incubator, the combination with an incubating chamber and means for sending a current of warm air through the chamber, of a plurality of egg carrying drawers in said chamber, said drawers being in line with the direction of the said current of air, and permitting the passage of air through the top and bottom of the drawers, openings in the wall of said chamber through which said drawers pass, and means coöperating with the sides and ends of each drawer permitting the withdrawal of the drawer and lessening the escape of air from said chamber during the act of withdrawal.

In testimony whereof I hereunto affix my signature in the presence of two witnesses.

CHARLES M. HECK.

Witnesses:
L. S. BACON,
CALVIN T. MILANS.